US00RE39093E

(19) United States
(12) Reissued Patent
Savoca

(10) Patent Number: US RE39,093 E
(45) Date of Reissued Patent: May 9, 2006

(54) MAST-TYPE OUTDOOR LIGHTING SYSTEM

(75) Inventor: Paul F. Savoca, East Patchogue, NY (US)

(73) Assignee: Duraline, a division of J.B. Nottingham Co., Inc., Central Islip, NY (US)

(21) Appl. No.: 10/364,510

(22) Filed: Feb. 12, 2003

Related U.S. Patent Documents

Reissue of:
(64) Patent No.: 5,335,160
Issued: Aug. 2, 1994
Appl. No.: 08/090,942
Filed: Jul. 13, 1993

(51) Int. Cl.
*F21S 13/10* (2006.01)

(52) U.S. Cl. ..... 362/431; 362/153.1; 362/276; 362/802; 174/38; 174/45 R; 361/601; 439/474

(58) Field of Classification Search ..... 362/153, 362/153.1, 431, 457, 802, 276; 439/474, 439/923; 361/93, 104, 118, 601; 174/37, 174/38, 39, 45 R
See application file for complete search history.

(56) References Cited

U.S. PATENT DOCUMENTS

| | | | | | |
|---|---|---|---|---|---|
| 342,552 | A | * | 5/1886 | Westinghouse, Jr. | 174/38 |
| 1,162,657 | A | * | 11/1915 | Schweitzer | 336/58 |
| 1,189,459 | A | * | 7/1916 | Lundin | 174/45 R |
| 1,338,028 | A | * | 4/1920 | Linehan | 40/608 |
| 1,560,289 | A | * | 11/1925 | Noll | 362/431 |
| 1,776,682 | A | * | 9/1930 | King | 362/431 |
| 1,981,460 | A | * | 11/1934 | Miller | 439/281 |
| 3,187,175 | A | * | 6/1965 | Lang | 362/431 |

(Continued)

FOREIGN PATENT DOCUMENTS

| | | | |
|---|---|---|---|
| DE | 3036629 A1 | * | 5/1982 |
| EP | 0334610 B1 | * | 3/1994 |
| EP | 0334609 B1 | * | 6/1994 |
| FR | 1438539 | * | 4/1966 |

OTHER PUBLICATIONS

Expert Report Under FED.R.CIV.P.26(a)(2)(B) of Carl R. Tamm, Civil Action #4:99 CV311–WS Dated Oct. 2, 2000 including Patents 4,909,481; 5,029,817; D318,784; 5,214, 247; 5,236,177; 5,267,880; 5,557,070; 5,335,160; 3,518, 600; 4,909,761; FR1,438,539.*

(Continued)

*Primary Examiner*—Y. My Quach-Lee
(74) *Attorney, Agent, or Firm*—Nixon Peabody LLP

(57) ABSTRACT

An improved outdoor lighting system is provided that comprises a light assembly formed from at least one tubular mast having a distal end for supporting an electrically powered light source, and a proximal end mounted in the ground, and an electrical cable for connecting the light source to an underground power source. The improved system includes an electrical connector assembly in the cable located in the vicinity of the ground-mounted distal end of the tubular mast. The electrical connector assembly spontaneously disconnects in response to an application of an tensile force indicative of an automobile collision with the mast, thereby preventing damaging tensile forces from being transmitted along the underground portion of the cable to the circuit breaker. The system further comprises an underground fuse assembly and lightning arrestor, both of which are mounted in an underground box electrically connected between the circuit breaker, and the underground portion of the cable that terminates in the aforementioned connector assembly. The remote, underground location of the fuse assembly and lightning arrestor provides easy and safe access to these components by maintenance personnel while discouraging vandals from tampering with or stealing these components.

54 Claims, 3 Drawing Sheets

U.S. PATENT DOCUMENTS

| | | | | | |
|---|---|---|---|---|---|
| 3,225,224 | A | * | 12/1965 | Rydbeck | 362/431 |
| 3,242,252 | A | * | 3/1966 | Bergenstein | 174/38 |
| 3,300,570 | A | * | 1/1967 | Spiece et al. | 174/38 |
| 3,364,635 | A | * | 1/1968 | Guggemos | 52/28 |
| 3,417,359 | A | * | 12/1968 | Urani | 337/201 |
| 3,518,600 | A | * | 6/1970 | Urani | 337/201 |
| 3,611,255 | A | * | 10/1971 | Shroyer | 439/282 |
| 3,753,192 | A | * | 8/1973 | Urani | 337/201 |
| 3,760,234 | A | * | 9/1973 | Jones et al. | 174/45 R |
| 3,761,865 | A | * | 9/1973 | Bomgaars et al. | 439/451 |
| 3,862,411 | A | * | 1/1975 | Persson | 362/431 |
| 4,072,857 | A | * | 2/1978 | DeVicaris | 362/123 |
| 4,109,989 | A | * | 8/1978 | Snyder et al. | 439/140 |
| 4,138,181 | A | * | 2/1979 | Hacker et al. | 439/258 |
| 4,237,530 | A | * | 12/1980 | Murray et al. | 362/418 |
| 4,392,192 | A | * | 7/1983 | Steadman | 362/418 |
| 4,499,527 | A | * | 2/1985 | Tauber et al. | 362/267 |
| 4,542,437 | A | * | 9/1985 | Ellis et al. | 361/721 |
| 4,617,768 | A | * | 10/1986 | Gebelius | 52/40 |
| 4,684,192 | A | * | 8/1987 | Long et al. | 439/374 |
| 4,698,717 | A | * | 10/1987 | Scheid | 439/923 |
| 4,701,537 | A | * | 10/1987 | Rosenquist | 549/228 |
| 4,707,046 | A | * | 11/1987 | Strand | 439/314 |
| 4,759,730 | A | * | 7/1988 | Sappington et al. | 439/622 |
| 4,827,389 | A | * | 5/1989 | Crum | 362/431 |
| 4,878,160 | A | * | 10/1989 | Reneau et al. | 362/269 |
| 4,909,761 | A | * | 3/1990 | Muguira | 439/622 |
| 4,911,652 | A | * | 3/1990 | Savoca et al. | 439/282 |
| 5,060,437 | A | * | 10/1991 | Parsons et al. | 52/298 |
| 5,069,531 | A | * | 12/1991 | Yamazaki et al. | 349/127 |
| 5,080,600 | A | * | 1/1992 | Baker et al. | 439/258 |
| 5,161,874 | A | * | 11/1992 | Benes | 362/552 |
| 5,243,508 | A | * | 9/1993 | Ewing et al. | 362/431 |
| 5,267,880 | A | * | 12/1993 | Tamm | 439/622 |

OTHER PUBLICATIONS

Flood Seal YY Type Disconnect Kits Fused & Non Fused Homac Mfg. Company Mar. 1987.*

Connector Kit Guide Street Highway & Area Lighting for 600 Volt Systems Homac Mfg. Company.*

Proven in Voer 10 Million Field Applications Homac Mfg. Company.*

Flood Seal in Line Splice Kits Homac Mfg. Company Dec. 1985.*

Flood Seal Three Wire Twin Tap Cover Homac Mfg. Company.*

Flood Seal Twin Tower Outlet Sleeve Homac Mfg. Company Oct. 1983.*

Twin Tapkits Homac Mfg. Company.*

Flood Seal Four Wire Twin Tap Cover Homac Mfg. Company Sep. 1987.*

Flood Seal Underground Cable Repair Kit Homac Mfg. Company Jun. 1985.*

Direct Burial Set Screw Bar Connectors Homac Mfg. Company Jun. 1985.*

Flood Seal in Line Disconnect Kits Homac Mfg. Company Jan. 1987.*

Flood Seal Y Type Disconnect Kits Homac Mfg. Company Jan. 1987.*

Flood Seal Insulated Crab Joints Homac Mfg. Company Sep. 1983.*

Crab Joints Roll Back Insulated Homac Mfg. Company Sep. 1983.*

Efficiency Experts Homac Mfg. Company.*

Copper Mechanical Lugs ML Series Homac Mfg. Company Oct. 1983.*

Flood Seal UF Splicing Kits/Adapters Homac Mfg. Company Oct. 1987.*

At Last! UP Cable Watertight Splices Homac Mfg. Company Oct. 1987.*

Submersible Cable Splicing Kit Guide for Copper and Aluminum Conductors/Submersible Splice Covers for 600 Volt Insulated Cable Homac Mfg. Company Jul. 1987.*

Guide is Intended as an Aid Homac Mfg. Company.*

Standard Specifications for Structural Supports for Highway Signs 1994 Luminaries & Traffic Signals 1994 Published by the American Association of State Highway & Transportaion Officials.*

Highway Engineering Handbook Building & Rehabilitating the Infrastructure Roger L. Brockenbrough et al.*

State of California Department of Transportation Standard Specifications Jul. 1999.*

Tron in Line Waterproof Fuse Holders With Optional Break Away Receptacles for Street & Highway Light Standards McGraw Edison Bulletin SFH11 Jun. 1984.*

Blueprint State of Alabama Highway Department Plans of Proposed Project nhf101(69) Interchange Lighting 1–10/ Dawes Road Mobile Country Dec. 18, 1992.*

Bussmann Technical Marketing Bulletin May 13, 1992.*

New Product Release Gould Shawmut GED AA in Line Series Breakway Fuseholders.*

Flood Seal Y Type Disconnect Kits Homac Mfg. Coompany Apr. 1985.*

Waterproof Streetlight Connector Kits Buchanan.*

Tron in the Line Waterproof Fuseholder With Breakaway Feature or with Standard Connections.*

Blueprint Montana Department of Highways Federal Aid Protection No. HES 17–1(13)425 Intersection Lighting US 2 & Secondary 241 South of Harlem Blain County Jul. 25, 1991.*

Tron in Line Waterproof Fusholder Section 2–2 Fuseblocks & Fuseholders pp. 4–8 & pp. 3–3–17 Aug. 1991.*

Blueprint Montana Department of Highways Federal Aid Project No. IR 15–4(68)193 Traffic Control Devices Cedar Street Interchange Helena Lewis & Clark Country May 23, 1991.*

SEC Single Fused Connector Kit–Model SEC 1791–SF for Copper or Aluminum Solid or Stranded Jul. 17, 1991.*

Blueprint Montana Department of Highways Federal Aid Project No. HES 4141(30) Unit 4 Street Lighting Division Street Grand Avenue to Montana Aveneu Billings Yellowstone County Jan. 26, 1989.*

Blueprint Montana Department of Transportaion Federal Aid Project No. NH TE–A (15)6 Grade Gravel PL Mix Bit. Surf. & Drainage Billings Northwest Yellowstone County May 21, 1992.*

Inline Buss Fusholder.*

Standard Specifications for Road & Bridge Construction 1987 Edition Adopted by the Montana Department of Highways & the Montana Highway Commission Effective J/1/ 1987.*

Brochure Buchanan. Supersafe Support Grips Daniel Woodhead Company p. 239. Super Safe Support Grips Daniel Woodhead Company p. 241.*

Buchanan D65 Fused Connector Kit.*

Faxtransmittal From Harry Manz to Carolina High Mast Inc. Tom Ginsburg Regarding New Jersey DOT JBF Foundation Drawing L0494.*

Buss Catalog SFB Electronic & Small Dimension Fuses Section 4–2 Buss Fuseholders Jun. 1983. Buchanan Technical Data Sheet Breakaway Single Pole in Line Nonfusible Kits Oct. 1, 1988. Littlefuse Power Gard Products 1993.*
Buchanan Waterproof Connector Kit. Florida Department of Transportation Drawing No. 17500 Aug. 1978 "Conventional Pole Details". Bulletin SFH–11 Entitled Tron in the Line Waterproof Fuse Holder McGraw Edison Company Jul. 1984.*
Florida Department of Transportation Metal Pole Wiring Specifications Aug. 1978. Buchanan Construction Products Inc. Technical Data Sheet Breakaway in Line Fusible Connector Kits Oct. 1, 1988.*
Montana Department of Highways Specifications OFR Road & Bridge Construction Jan. 1, 1989. Buchanan Construction Products Inc. Catalog Waterproof Breakway Streetlight Connector & Splice Insulating Kits (Undated).*
Bussmann Catalog First Tron in the Line Fuse Holder (Undated). Bussmann Catalog Second Tron in the Line Fuse Holders (Undated). Bussmann Catalog Buss Electronic & Small Dimension Fuses (Undated).*

Amerage Corporation Elastimold 600 Volt Waterproof Connector Kits Catalog REV. 1 (Dec. 1984). Bulletin SFH–11 Tron in the Line Waterproof Fuse Holder McGraw Edison Company.*

Brochure Waterproof Breakaway Streetlight Connector & Splice Insulating Kits Buchanan Construction Product, Inc. Blueprint Conventional Pole Details Florida Department of Transportation.*

State of Louisiana Publication Standard Specification for Roads & Bridges Oct. 1971. Drawing Breadaway & Tap Connector Diagrams. Airport Lighting Highway Intensity Runway Runway & Threshold Marker Lights 9515 p. 13 Feb. 4, 1952.*

Drawing Tron Breakaway Fuseholder Assy. Mar. 4, 1994.*

* cited by examiner

MAST-TYPE OUTDOOR LIGHTING SYSTEM

Matter enclosed in heavy brackets [ ] appears in the original patent but forms no part of this reissue specification; matter printed in italics indicates the additions made by reissue.

*This reissue application of U.S. Pat. No. 5,335,160 was merged with reexamination application Nos. 90/005,715; 90/005,719 and 90/006,130 previously filed on Apr. 28, 2000, May 4, 2000 and Oct. 16, 2001, respectively, and is the parent of continuation reissue application No. 10/960,901 filed Oct. 8, 2004.*

BACKGROUND OF THE INVENTION

This invention generally relates to outdoor lighting systems for illuminating highways or airports and the like, and is specifically concerned with an improved system of the type wherein outdoor lights are mounted on a plurality of spaced-apart tubular masts and powered by a common, underground circuit breaker.

Outdoor lighting systems for illuminating streets and highways are known in the prior art. Such lighting systems typically include a plurality of lighting units spaced along the road or highway, each of which includes an electric light that is supported on the distal end of a tubular mast whose proximal end is anchored into the ground. In some instances, the lights are suspended over the street or highway by a cantilevered support member attached to the mast. In other instances, a ring of high intensity lights circumscribes the distal end of the mast. In either instance, an electric power cable connects each of the spaced-apart, mast-supported lights to a common power source in the form of the output of an above-ground circuit breaker. The electric power cable for each lighting unit includes a first portion that is connected to the light source and disposed within the hollow mast, and a second portion disposed underground and connected to a power source in the form of either the aforementioned circuit breaker, or the power cable of an adjacent lighting unit. Additionally, both a fuse assembly and a lighting arrestor are disposed within the hollow end of the mast and connected between the first and second portions of the electric cable for preventing current overloads to the light fixture, and for protecting the circuit breaker from current surges caused by lightning. To provide access to the fuse assembly and lightning arrestor, a removable panel is usually provided at the base of the mast. Additionally, the wrenching tensile forces applied throughout the length of the cable just before the breakage thereof at the fuse assembly splices often weakens splices and other connections made with adjacent lighting units, setting the stage for future maintenance problems that are difficult to diagnose and solve.

While such prior art lighting system are widely used to illuminate streets, highways, and virtually any place where large amounts of outdoor lighting is required, the applicant has observed a number of shortcomings associated with the design of these systems which significantly impairs their overall usefulness.

For example, if one of the masts of such a system should be knocked down as a result of an automobile collision, the stresses applied to the cable within the mast often causes it to break at the connections made with the fuse assembly. As these connections are typically made by way of splices, the tension applied to the cable from the automobile collision tears the splices apart, dangerously exposing wires that are "hot". These exposed, hot wires can in turn conduct dangerous electrical currents through the knocked-down mast (which is typically made of a conductive metal) or even the body of the colliding car. Even if the collision causes the exposed conductors of the broken cable splice to short circuit and trip the circuit breaker, this somewhat safer result is not particularly desirable, as such tripping will cut off the current flowing to all of the other mast-supported lights that are serially connected to the breaker, thus surrounding the area around the broken mast in total darkness if the collision occurs at night. Additionally, the wrenching tensile forces applied throughout the length of the cable just before the breakage thereof at the fuse assembly splices often weakens splices and other connections made with adjacent lighting units, setting the stage for future maintenance problems that are difficult to diagnose and solve.

Still another shortcoming of prior art lighting systems results from the positioning of the fuse assembly and lightning arrestor in the base of the hollow mast in each lighting unit. Because such masts usually have openings at their upper ends or sides for structural reasons, the interior of such masts often becomes the home of wildlife that is either potentially hostile (such as wasps, poisonous snakes, or rats) or of the type apt to build nests around these components (such as birds or squirrels). The presence of such animal life significantly impairs the replacement of fuses of burned-out lightning arrestors by either assaulting the maintenance personnel who carry out such operations, or by creating physical obstructions (such as nests) that must be removed incident to such operations. Additionally, the spliced connection between the lightning arrestor and the cable that supplies electrical power to the light source makes it difficult to replace this component in the event of a burn out of the surge arrestor circuit in the arrestor from a bolt of lightning striking the conductive mast.

A final shortcoming of such prior art systems results from the relatively easy access to the components and cables located inside the masts near the proximal ends thereof. The present access panels are easily opened by vandals who may tamper with or destroy the components inside, or by thieves who attach the cable leading to the circuit breaker to a truck and pull it out of the ground for the purpose of selling the relatively large amounts of copper in it. In recent years, such vandalism and theft has been a major drain on the maintenance budgets for such lighting system in both the public and the private sectors of the economy.

Clearly, there is a need for an improved outdoor lighting system having some sort of means for preventing the creation of dangerous exposed "hot" wires in the event of a collision between an automobile and a mast, as well as a means for preventing dangerous destructive forces generated by such collisions from being transmitted from the power cable inside the mast to other splices and connections all throughout the system. Ideally, such a system should deploy the fuse assembly and lightning arrestor in a location which is reasonably accessible to maintenance personnel, but completely inaccessible to potentially hostile wildlife. Such a system should further make is difficult, if not impossible, for vandals or thieves to destroy or steal large lengths of heavy copper cables or other valuable components located inside the masts. Finally, it would be desirable if such a system could be easily retrofitted onto prior art, mast-type outdoor lighting systems in a relatively quick and cost-efficient manner.

SUMMARY OF THE INVENTION

The invention is an improved outdoor lighting system of the type including at least one lighting assembly having a tubular mast, and an electrical cable extending through the mast and underground for connecting a light source located at a distal end of the mast to a circuit breaker that overcomes or ameliorates all of the aforementioned shortcomings associated with prior art outdoor lighting systems. The invention comprises an electrical connector assembly in the electrical cable near the proximal, ground-mounted end of the tubular mast for spontaneously disconnecting the cable at that location upon the application of a tensile force indicative of a vehicle collision with the mast. In the preferred embodiment, the electrical connector assembly includes first and second matable connectors which spontaneously disconnect upon the application of a tensile force much less than that which would damage the connection between the electrical cable and the underground circuit breaker (or other source of power) such as, for example, a force of between 20 and 30 pounds. The first and second matable connectors each include means for isolating the conductive pins and barrels contained in each from ambient water to prevent corrosion of the metals forming the conductive pins and barrels.

The improved system preferably further comprises an underground fuse assembly that electrically interconnects the circuit breaker with the underground portion of the cable that extends up from the ground and into the hollow interior of the tubular mast and which terminates in one of the two aforementioned electrical connectors. In the preferred embodiment, the underground fuse assembly includes a junction box connected to the portion of the cable that extends above ground and into the tubular mast, and a male fused connector detachably matable with the junction box. Similar to the aforementioned connector assembly disposed in the bottom of the mast, the fuse assembly connector disconnects upon the application of a tensile force which is less than the amount of force that would damage other connections within the vicinity of the fuse assembly, i.e., on the order of between 20 and 30 pounds. The fuse assembly and all connections are preferably mounted within an underground box which helps to isolate these components from the ambient ground and moisture. Additionally, the lid is secured with fasteners that are removable only with specially made tools to deter would-be vandals and thieves from tampering with or stealing the fuses and cables of the lighting system.

Finally, the improved system may include a lightning arrestor mounted in the same box that contains the fuse assembly. The lightning arrestor includes a surge suppressor circuit which is connected to a ground rod which extends outside the surrounding box. Preferably, the junction box that forms part of the fuse assembly also functions to electrically connect the cable leading from the light source to the surge suppressor circuit of the lightning arrestor, as well as to the power cable of an adjacent lighting unit. A third electrical connector may be provided in the cable between the junction box and the surge suppressor circuit so that the surge suppressor circuit may be easily replaced if burned out as a result of lightning striking the light source connected to the mast.

The invention further encompasses a method for improving an outdoor lighting system of the aforementioned type wherein a fuse assembly and a lightning arrestor is mounted within the hollow interior of the mast, and connected by way of splices to the cable inside the mast that connects the light source with the circuit breaker. In this method, the fuse assembly and lightning arrestor are removed from the interior of the mast, and the spliced ends of the cable disposed within the mast are replaced at least in part with a second cable that terminates in an electrical connector near the distal end of the mast. The fuse assembly and lightning arrestor are relocated in an underground box, and are electrically connected between the circuit breaker and the cable disposed within the mast by means of a second cable that terminates in a second connector which extends above ground within the interior of the mast, and which is matable with the first connector that ultimately leads to the light source.

Both the improved system and the method of the invention results in an outdoor lighting system that is far safer in the event of an automobile collision with one of the masts of the systems, since the forces associated with the collision will only cause the electrical connector assembly at the proximal end of the mast to spontaneously disconnect without exposing any dangerous wires, and without transmitting any potentially damaging tensile forces to other cables and connectors of the system. Locating the fuse assembly and lightning arrestor in an underground box, instead of within the hollow base of the mast, discourages vandals from stealing or damaging these components while freely allowing maintenance personnel with the proper tools to safely access these components without disturbing potentially hostile wildlife.

BRIEF DESCRIPTION OF THE SEVERAL FIGURES

Figure 4:
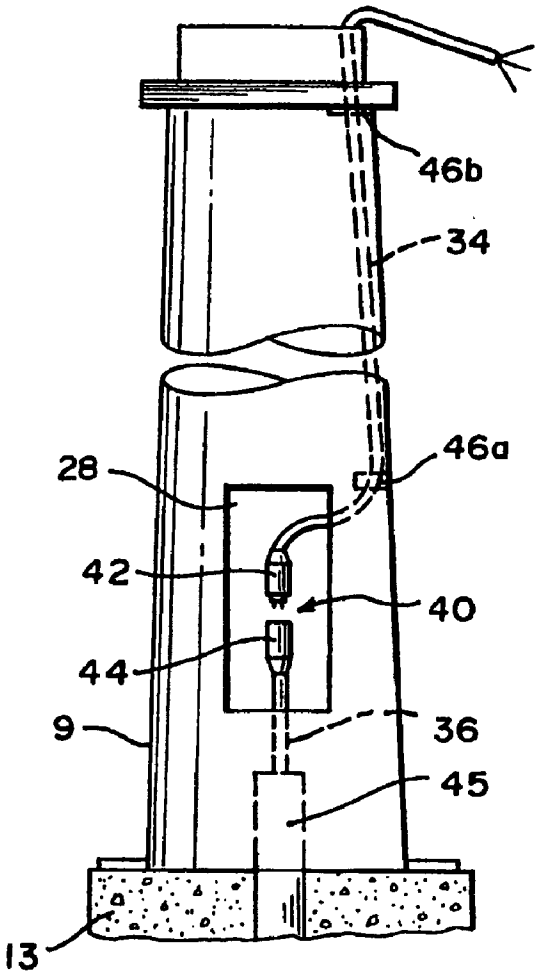
Figure 3:
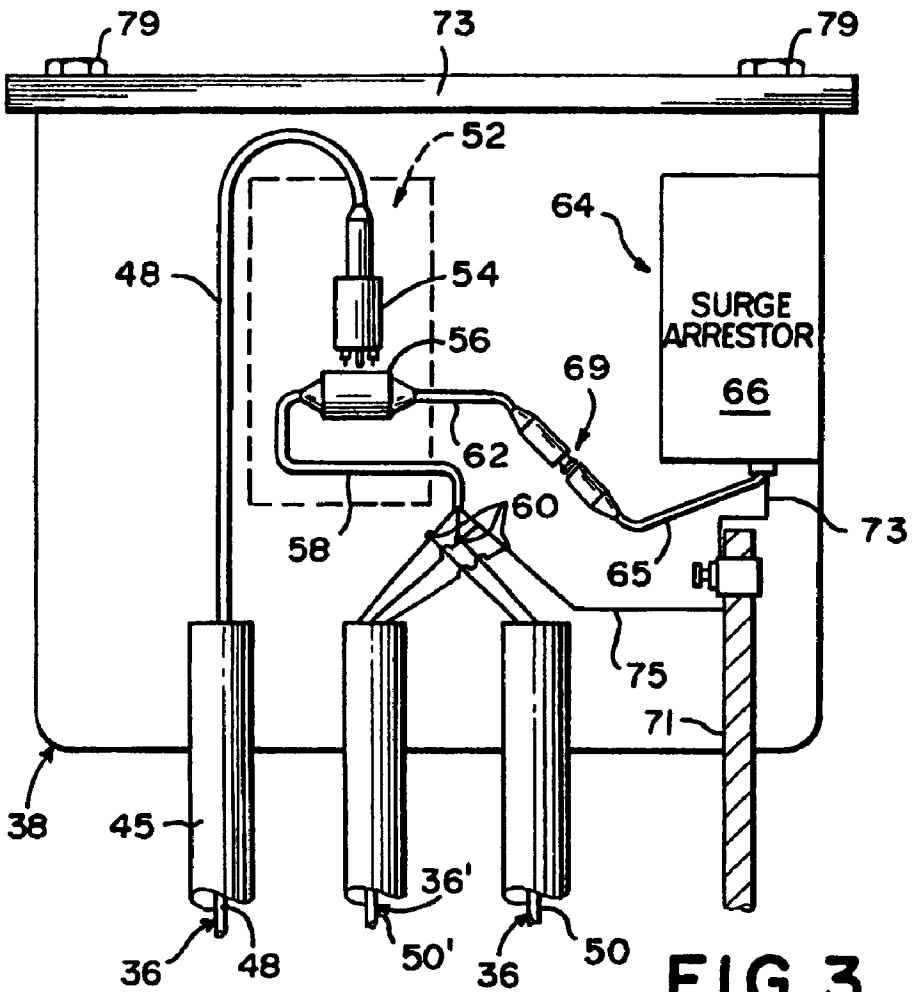

FIG. 3 is an enlarged view of one of the utility boxes of the invention, illustrating in detail the electrical connectors used in the fuse assembly and in the lightning arrestor; and FIG. 4 is an enlarged side view of the proximal end of one of the masts of the light assemblies with the access panel removed, illustrating the electrical connector that is used in lieu of splices to interconnect the cable leading to the light source to the fuse assembly contained in the utility box.

DETAILED DESCRIPTION OF THE PREFERRED EMBODIMENT

Figure 1:
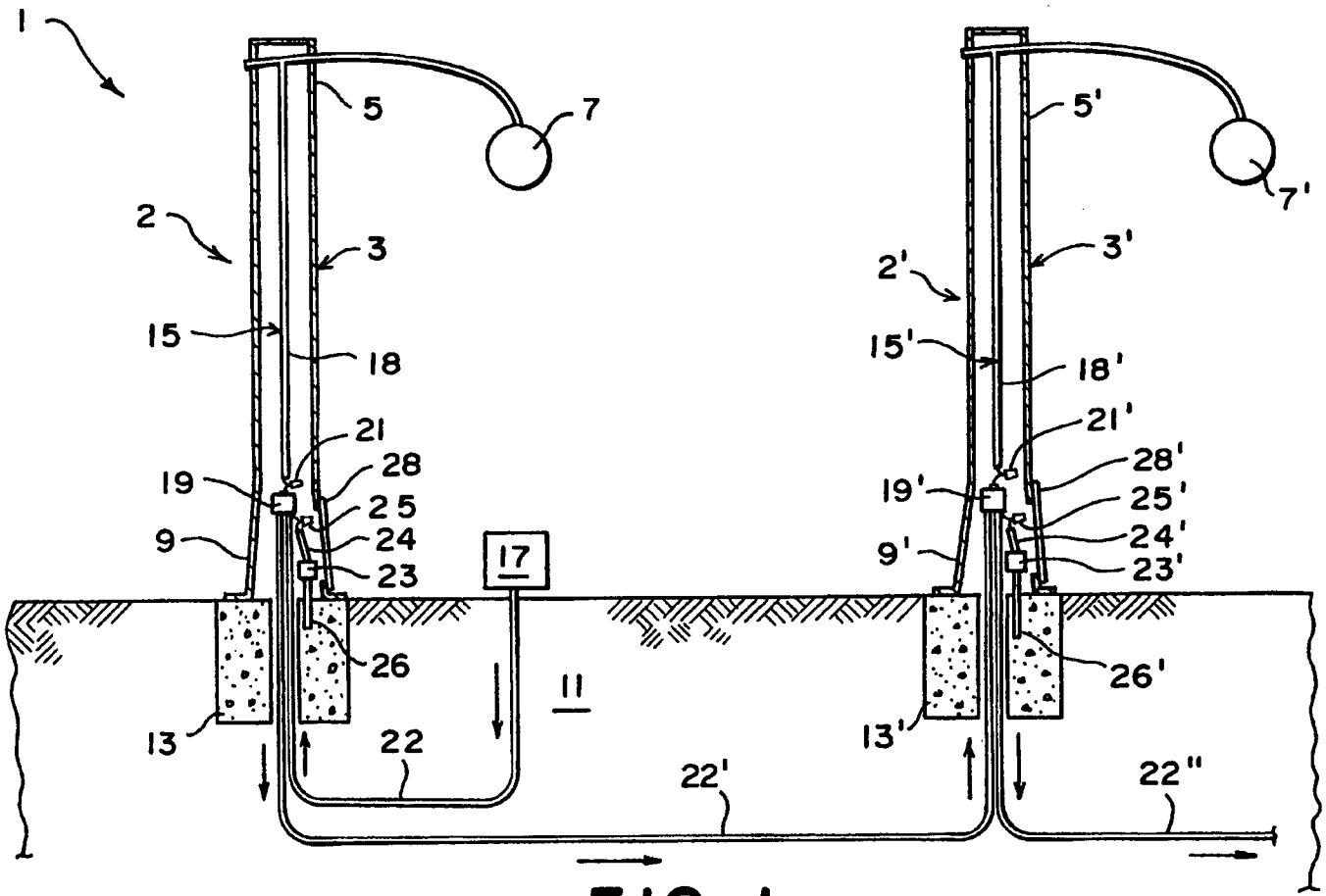
FIG. 1 PRIOR ART
FIG. 1 is a cross-sectional side view of a prior art lighting system having a plurality of individual light assemblies that are serially connected to each other and to a common circuit breaker, and whose fuse assemblies and lightning arrestors are mounted within the masts of the light assemblies.

With reference now to FIG. 1, the invention is an improvement of a lighting system 1 of the type comprising a plurality of light assemblies 2 and 2', each of which includes a hollow metallic mast 3. Each mast 3 includes a distal end 5 for supporting a light source 7 and a proximal end 9 mounted in the ground 11 by means of a concrete reinforced underground base 13. Disposed within the interior of each the masts 3 is an electrical power cable 15 which interconnects the light source 7 of each of the light assemblies 2 with a power source. In the case of the first light assembly 2, the power source is an outlet of an above ground circuit breaker 17. In the case of the second assembly 2' (and all subsequent light assemblies not shown) the power source is an outlet of the fuse assembly 19 of the adjacent light assembly. Hence, should the circuit breaker 17 become tripped by any of the light assemblies 2, 2' for any reason, all of the light assemblies ultimately connected to it will be switched off.

In the lighting system 1, the electrical power cable 15 of each of the light assemblies includes a first portion 18 that is connected between the light source 7 and the fuse assembly 19 by way of a splice connection 21. The cable 15 further includes a second portion 22 connected between the fuse assembly 19 and a power source in the form of either the circuit breaker 17, or the fuse assembly of an adjacent light assembly. Finally, each of the light assemblies 2 includes a lightning arrestor 23 that is connected by way of a cable 24 to a fuse assembly 19 by way of other splice connections 25. A ground rod 26 forms part of each of the lightning arrestors 23 in order to ground out current surges flowing through the power cable 15 and fuse assembly 19 caused by lightning striking the metallic mast 3. To provide access to both the fuse assembly 19 and lightning arrestor 23 of each of the light assemblies 2,2', includes an access panel 28 at the base of its mast 3.

In the event that an automobile should collide with the mast 3 of any of the light assemblies 2,2', the resulting tensile forces applied to the electrical power cable 15 often causes the cable to break at the splice connection 21 between the first portion 18 of the cable 15, and the fuse assembly 19. Depending upon the geometry of the fracture of the mast 3, these exposed "hot" wires could electrify the metallic mast, or the metallic body of the colliding automobile, thereby setting the stage for dangerous electrical shocks to the driver of the automobile, or to rescue workers or onlookers. Even if the exposed wires from the broken splice 21 are short circuited to the extent that the circuit breaker 17 trips, the situation is still not fully satisfactory, as such a tripping would cause the lights on all of the light assemblies 2,2', etc. to turn off, thereby leaving the areas surrounding the accident in total darkness if the accident occurs at night. Finally, because the fuse assembly 19 and lightning arrestor 23 are contained within the hollow mast 3 of each of the various light assemblies 2,2', and because some types of hostile wildlife often reside in or build nests within these masts 3, the persons who remove the panels 28 to perform maintenance operations on the light assembly 2 may be stung or bitten by such wildlife.

To solve these and other problems set forth with more specificity in the "Background . . . " section of this application, the improved lighting system 30 illustrated in FIGS. 2–4 was developed. In this improved system, the previously described electrical power cable 15 in each of the light assemblies 1,1', etc. is replaced with a different power cable 32. Cable 32 includes a first portion 34 that extends between the light source 7 of each of the light assemblies down to the proximal portion 9 of the mast 3 of its respective light assembly 2, as well as a second portion 36 that leads from the proximal end 9 of mast 3 all the way to an underground utility box 38 as shown. As is best seen with respect to FIGS. 2 and 4, an electrical connector assembly 40 electrically and mechanically interconnects the adjacent ends of the first and second portions 34,36 of the cable 32 in the proximal portion 9 of the mast 3. The electrical connector assembly 40 of each of the light assemblies 2,2' includes a three-prong male connector at the end of the first portion 34 of the cable 32, and a three-barrelled female connector 44 located at the upper end of the second portion 36 of the cable 32. The female connector 44 extends up through a stub conduit 45 as shown in FIG. 4. Additionally, to relieve tension from the electrical connections between the distal end of the first portion 34 of the cable 32 and the light source 7, the first portion 34 is securely mounted to the inner wall of the mast 3 by means of mounting clamps 46a,b.

In the preferred embodiment, the electrical connector assembly 40 is a combination of a Model MTP-3 and FTP-3 three pin and three barrel connector manufactured by the Duraline Division of J. B. Nottingham and Company, located in Central Islip, N.Y. Such connectors require an engagement force of 25 pounds in order to mate into position illustrated in FIG. 2, and a disengagement force of 25 pounds in order to detach in the position illustrated in FIG. 4. The bodies of each of the connectors 42 and 44 are preferably formed from an elastomer which is integrally molded to the ends of their respective cable portions. The pins of the male connector 42 are mounted on a protruding face that is received in a complementary recess (not shown) in the female connector 44 and which serves to create a water-tight seal between the connectors 42, 44. Alternatively, the water-sealing structure disclosed in the connectors in U.S. Pat. No. 4,911,652, (assigned to the Duraline Division of J. B. Nottingham and Company) may also be used, the entire text of which is expressly incorporated into the specification of this application by reference.

Figure 2:
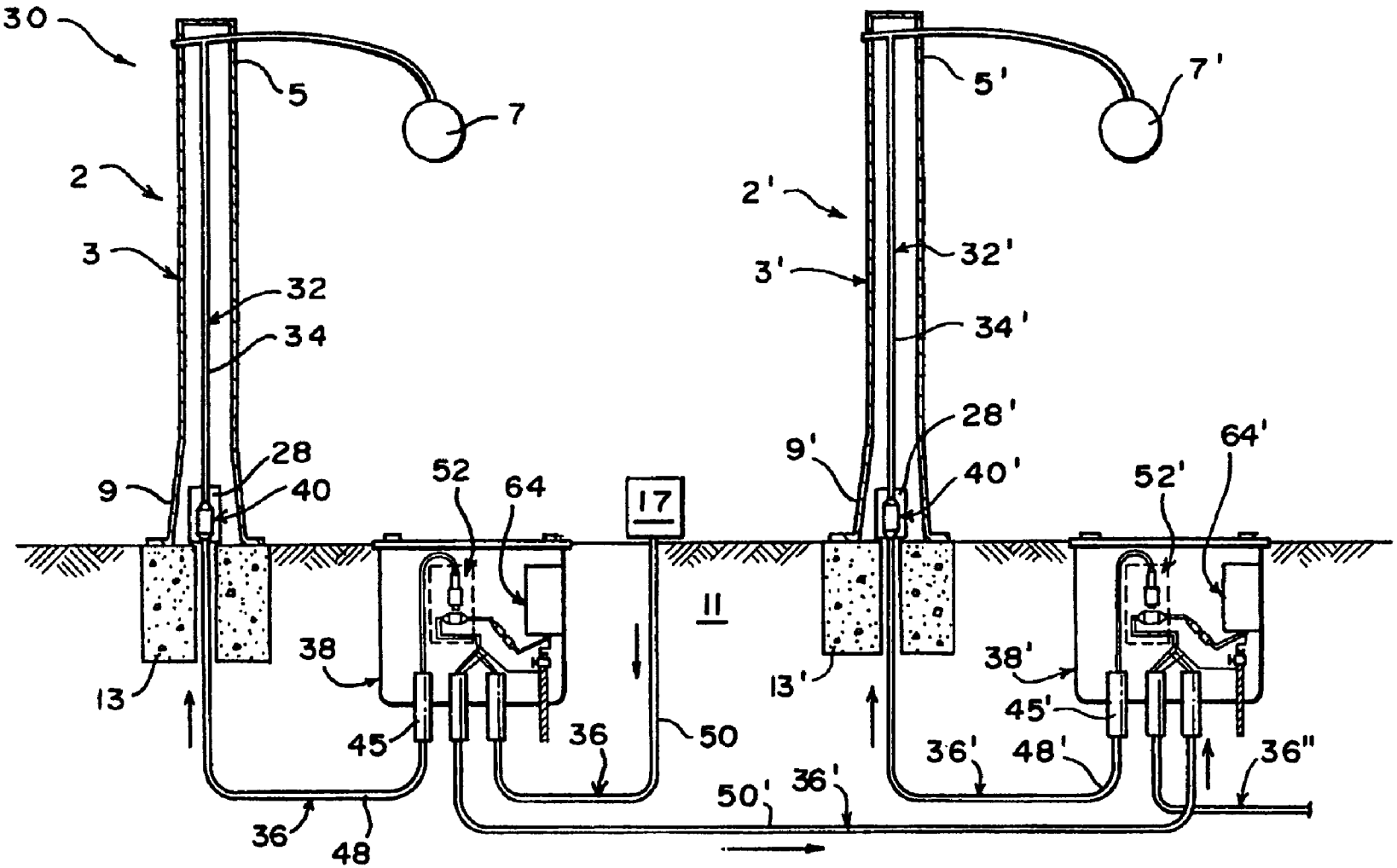
FIG. 2 is a cross-sectional side view of the improved lighting system of the invention that comprises a plurality of light assemblies which are serially connected to each other and to a common circuit breaker by way of a plurality of utility boxes, each of which include the fuse assembly and lightning arrestor of one of the lighting assemblies.

With reference now to FIGS. 2 and 3, the second portion 36 of the cable 32 includes a first segment 48 that extends between the female connector 45 and the underground utility box 38, and a second segment 50 that extends between the box 38 and a source of electrical power. In the case of light assembly 2, the source of electrical power is circuit breaker 17; in the case of subsequent light assemblies 2', the source of electrical power is an outlet of the utility box 38 associated with an adjacent light assembly 2.

The underground utility box 38 for each of the light assemblies, includes a fuse assembly 52 in the form of a fused male connector 54 which plugs into a junction box 56 as shown. In the preferred embodiment, male connector 54 is a Model 3MFP3 16-5 adaptor-type plug likewise manufactured by the Duraline Division of J. B. Nottingham and Company. Such plugs are capable of holding two 5 amp, 600 volt fuses (not shown) in a tubular recess inside the plug. The fuses may be installed or replaced by simply screwing out the male connector pins that project outwardly from the face of the connector 54. Each of the two current carrying pins includes integrally molded 0 rings for providing a water-tight seal when mated and fully seated to the distribution block 56. In the preferred embodiment, distribution block 56 is a Model 3B5-2 block which again is manufactured by the Duraline Division of J. B. Nottingham and Company. Like the previously discussed connector assembly 40, an engagement force of 25 pounds is required to fully mate or disconnect the fused male connector 54 from the female connector contained with the junction box 56. The junction box 56 is connected to a source of power by means of inlet cable 58 which in turn is spliced to the end of second cable segment 50 of cable portion 36. While not specifically shown in the drawing, junction box 56 is mounted within the walls of the utility box 38 to insulate the splice connection 60 from any tensile forces applied to box 56 by male connector 54.

Finally, the underground utility box 39 includes a lightning arrestor 64. The lightning arrestor 64 includes an inlet cable 65 leading from the junction box 56 to a surge arrestor circuit 66. An electrical coupling 69 is provided in the inlet cable 65 so that the surge arrestor circuit 66 may be easily replaced in the event that it is burned out as a result of lightning striking the metallic mast 3, which in turn could cause a current surge through cable segment 48 and from thence through junction box 56. A ground rod 71 is connected to the surge arrestor circuit 66 by means of an electrical wire 73 clamped thereon. Additionally, the ground rod 71 is attached to the ground wire of the cable segment 50' which interconnects the fuse assembly 52' of the adjacent light assembly 2' with the outlet of the circuit breaker 17 as indicated. The purpose of such a connection is, of course, to assist the lightning arrestor 64 in grounding out any current surge applied to power cable 32' as a result of lightning striking the mast 3'.

The utility box 38 is located in the ground as shown, and is sealed in a water-tight fashion by means of a lid 73 which prevents any local wildlife from entering or residing in the interior of the box 38. The lid is secured over the top end of the box 38 by means of tamper proof hardware 79 of a type known in the prior art which can only be removed with the use of special tools to discourage vandals from tampering with or stealing the components within the box 38.

The method of the invention may be used to convert the lighting system I illustrated in FIG. 1 to the improved lighting system 30 illustrated in FIGS. 2–4. In the first step of this method, both the fuse assembly 19 and lightning arrestor 23 are removed from the interior of the mast 3 of each of the light assemblies 2,2'. Next, a utility box 38 is provided adjacent to each of the light assemblies 2,2' as shown in FIG. 2, wherein the box 38 contains a new fuse assembly 52 and lightning arrestor 64 as previously described. Next, the old electrical power cable 15 is replaced with a new cable 32 which has all of the aforementioned portions 34,36 and segments 48,50 interconnected between the connector assembly 40, the utility box 38, and the circuit breaker 17 or other power source in the manner previously described. It should be noted that the underground segments 48,50 of the portion 36 of cable 32 are completely contained within underground conduits, only portions of which are shown in FIGS. 2 and 4 for the sake of simplicity.

Various modifications and additions to the improved lighting system 30 of the invention will become evident to those skilled in the art. All such modifications and additions are intended to be encompassed within this invention, the scope of which is confined solely by the claims appended below.

I claim:

[1. An improved outdoor lighting system of the type including at least one light assembly tubular mast having a distal end for supporting an electrically powered light source, and a proximal end mounted in the ground, and an electrical cable for connecting the light source to a power source, said cable having a first portion disposed within said mast and connected to said light source, and a second portion disposed underground and connected to said power source, wherein the improvement comprises:

an electrical connector assembly means for detachably connecting said first and second portions of said cable and for spontaneously disconnecting said portions in response to an application of a tensile force on said connector that is less than a tensile force necessary to damage the connection between said second portion and said power source.]

2. [The improved outdoor lighting system of claim 1,] *An improved outdoor lighting system of the type including at least one light assembly tubular mast having a distal end for supporting an electrically powered light source, and a proximal end mounted in the ground, and an electrical cable for connecting the light source to a power source, said cable having a first portion disposed within said mast and connected to said light source, and a second portion disposed underground and connected to said power source, wherein the improvement comprises:*

*an electrical connector assembly means for detachably connecting said first and second portions of said cable and for spontaneously disconnecting said portions in response to an application of a tensile force on said connector assembly means that is less than a tensile force necessary to damage the connection between said second portion and said power source, and* wherein said electrical connector assembly means is located in the interior of said mast near the proximal end thereof, and spontaneously disconnects upon the application of a tensile force between about 20 and 30 pounds.

[3. The improved outdoor lighting system of claim 1, wherein said electrical connector assembly means includes first and second detachably matable connectors, and means for preventing ambient water from entering said assembly when said connectors are mated.]

[4. The improved outdoor lighting system of claim 1, wherein said improvement further comprises means for securing said first portion of said cable to said tubular mast to isolate the connection between said light source and said cable from tensile forces applied to the first portion of said cable.]

5. [The improved outdoor lighting system of claim 1,] *An improved outdoor lighting system of the type including at least one light assembly tubular mast having a distal end for supporting an electrically powered light source, and a proximal end mounted in the ground, and an electrical cable for connecting the light source to a power source, said cable having a first portion disposed within said mast and connected to said light source, and a second portion disposed underground and connected to said power source, wherein the improvement comprises:*

*an electrical connector assembly means for detachably connecting said first and second portions of said cable and for spontaneously disconnecting said portions in response to an application of a tensile force on said connector assembly means that is less than a tensile force necessary to damage the connection between said second portion and said power source, and* wherein the improvement further comprises an underground fuse assembly interconnecting a first segment of said second cable portion that terminates in said electrical connector assembly means with a second segment of said second cable portion that terminates in a circuit breaker whereby the need for a fuse assembly in electrical contact with the first cable portion in the interior of the mast is obviated.

6. [The improved outdoor lighting system of claim 1,] *An improved outdoor lighting system of the type including at least one light assembly tubular mast having a distal end for supporting an electrically powered light source, and a proximal end mounted in the ground, and an electrical cable for connecting the light source to a power source, said cable having a first portion disposed within said mast and connected to said light source, and a second portion disposed underground and connected to said power source, wherein the improvement comprises:*

*an electrical connector assembly means for detachably connecting said first and second portions of said cable and for spontaneously disconnecting said portions in response to an application of a tensile force on said connector assembly means that is less than a tensile force necessary to damage the connection between said second portion and said power source, and* wherein the improvement further comprises an underground lightning arrestor interconnecting a first segment of said second cable portion that terminates in said electrical connector assembly means with a second segment of said second cable portion that terminates in a circuit breaker whereby the need for a lightning suppressor in electrical contact with the first cable portion in the interior of the mast is obviated.

7. The improved outdoor lighting system of claim 5, wherein said underground fuse assembly includes [a] first and second matable connectors, one of which includes at least one fuse, and an underground box for containing said fuse assembly.

8. The improved outdoor lighting system of claim 6, wherein said underground lightning arrestor includes a junction connector and a surge arrestor circuit including a ground rod and an underground box, wherein said junction connector functions to interconnect one end of said first segment of said second cable portion with both one end of said second segment of said second cable portion and said surge arrestor circuit, and said underground box contains said junction connector, surge arrestor circuit [anti] *and* cable segment ends.

9. The improved outdoor lighting system of claim 8, wherein said underground lightning arrestor further includes an electrical connector assembly for detachably connecting the surge arrestor circuit to the junction connector to facilitate replacement of the surge arrestor circuit.

10. The improved outdoor lighting system of claim 7, further comprising a second electrical cable connected at one end to said second segment of said second cable portion, and at the other end to a second light source of a second light assembly whose second electrical cable includes the improvement of the first electrical cable.

11. An improved outdoor lighting system of the type including a light assembly formed [front] *from* at least one tubular mast having a distal end for supporting an electrically powered light source, and a proximal end mounted in the ground, and an electrical cable for connecting the light source to a circuit breaker, said cable having a first portion disposed within said mast and connected to said light source, and a second portion disposed underground and connected to said circuit breaker, wherein the improvement comprises:

an underground fuse assembly interconnecting a first segment of said second cable portion that terminates in said first cable portion with a second segment of said second cable portion that terminates in said circuit breaker whereby the need for a fuse assembly in electrical contact with said first cable portion in the interior of the mast is obviated.

12. The improved outdoor light system of claim 11, wherein the improvement further comprises an underground lightning arrestor connected to said second cable portion that terminates in [said] *an* underground circuit breaker whereby the need for a lightning arrestor in electrical contact with the first cable portion in the interior of the mast is obviated.

13. An improved outdoor lighting system of the type including at least one tubular mast having a distal end for supporting an electrically powered light source, and a proximal end mounted in the ground, and an electrical cable for connecting the light source to an underground circuit breaker, said cable having a first portion disposed within said mast and connected to said light source, and a second portion disposed underground and connected to said circuit breaker, wherein the improvement comprises:

an underground lightning arrestor having a surge arrestor circuit contained in an underground box for interconnecting a first segment of said second cable portion with a second segment of said second cable portion that terminates in said circuit breaker whereby the need for a lightning suppressor in the interior of the mast is obviated.

14. The improved outdoor lighting system of claim 11, wherein said underground fuse assembly includes a first and second matable connectors, one of which includes at least one fuse, and an underground box for containing said fuse assembly.

15. The improved outdoor lighting system of claim 14, wherein said first and second matable connectors will spontaneously disconnect in response to the application of a tensile force that is less than a tensile force necessary to damage connections between said first segment and said second segment.

16. [The improved outdoor lighting system of claim 15.] *An improved outdoor lighting system of the type including a light assembly formed from at least one tubular mast having a distal end for supporting an electrically powered light source, and a proximal end mounted in the ground, and an electrical cable for connecting the light source to a circuit breaker, said cable having a first portion disposed within said mast and connected to said light source, and a second portion disposed underground and connected to said circuit breaker, wherein the improvement comprises:*

*an underground fuse assembly interconnecting a first segment of said second cable portion that terminates in said first cable portion with a second segment of said second cable portion that terminates in said circuit breaker whereby the need for a fuse assembly in electrical contact with said first cable portion in the interior of the mast is obviated;*

*wherein said underground fuse assembly includes a first and second matable connectors, one of which includes at least one fuse, and an underground box for containing said fuse assembly;*

*wherein said first and second matable connectors will spontaneously disconnect in response to the application of a tensile force that is less than a tensile force necessary to damage connections between said first segment and said second segment; and* wherein said first and second matable connectors spontaneously disconnect upon the application of a tensile force of between about 20 to 30 pounds.

17. The improved outdoor lighting system of claim 13, wherein said underground lightning arrestor further includes a junction connector in said underground box, wherein said junction connector functions to interconnect one end of said first segment of said second cable portion with both one end of said second segment of said cable portion and said surge arrestor circuit, and said underground box contains said cable segment ends.

18. The improved outdoor lighting system of claim 17, wherein said underground lightning arrestor further includes an electrical connector assembly for detachably connecting the surge arrestor circuit to the junction connector to facilitate replacement of the surge arrestor circuit.

19. The improved outdoor lighting system of claim 17, wherein said surge arrestor circuit is connected to a ground rod that electrically contacts the surrounding ground.

20. The improved outdoor lighting system of claim 15, wherein said first and second matable connectors include electrically conductive pins and barrels, and means for forming a waterproof seal when mated to prevent ambient water from coming into contact with said pins and barrels.

21. A method for improving an outdoor lighting system of the type including at least one tubular mast having a distal end for supporting an electrically powered light source, and a proximal end mounted in the ground, and an electrical cable disposed partially within said mast and partially underground for connecting the light source to a circuit breaker, and a fuse assembly for a lightning arrestor disposed within said mast and connected by splices to the electrical cable, comprising the steps of:

removing said fuse assembly and lightning arrestor from the interior of the mast;

replacing said cable disposed in said mast at least in part with a second cable that terminates in an electrical connector near the [distal] *proximal* end of the mast;

providing a fuse assembly and a lightning arrestor in an underground location;

electrically connecting an input of said fuse assembly and lightning arrestor to said circuit breaker, and electrically connecting an output of said fuse assembly and lightning arrestor to said second cable with an underground third cable that terminates in an electrical connector by mating said third cable connector with said second cable connector.

22. The method of claim 21, wherein said mating connectors spontaneously disconnect said second and third cable in response to the application of a tensile force on said connectors that is less than a tensile force necessary to damage a connection between said third cable and said fuse assembly and lightning arrestor.

23. The method of claim 22, wherein said mating connectors spontaneously disconnect upon the application of a tensile force of between about 20 and 30 pounds.

*24. An improved outdoor lighting system of the type including at least one light assembly tubular mast having a distal end for supporting an electrically powered light source, and a proximal end mounted in the ground, and an electrical cable for connecting a light source to a power source, said cable having a first portion disposed within said mast and connected to said light source, and a second portion disposed underground and connected to said power source, wherein the improvement comprises:*

*an electrical connector assembly means for detachably connecting said first and second portions of said cable and for spontaneously disconnecting said portions in response to an application of a tensile force on said connector assembly means that is less than a tensile force necessary to damage the connection between said portion and said power source, and*

*means for securing said first portion of said cable to said tubular mast to isolate the connection between said light source and said cable from tensile forces applied to the first portion of the cable.*

*25. The improved outdoor lighting system of claim 5, wherein said fuse assembly includes at least one fuse, and a box for containing said fuse assembly.*

*26. The improved outdoor lighting system of claim 6, wherein said underground lightning arrestor includes a surge arrestor circuit contained in a box.*

*27. The improved outdoor lighting system of claim 25, wherein said box is underground.*

*28. The improved outdoor lighting system of claim 26, wherein said box is underground.*

*29. The improved outdoor lighting system of claim 27, wherein said box is positioned below and beside said electrical connector assembly means.*

*30. The improved outdoor lighting system of claim 28, wherein said box is positioned below and beside said electrical connector assembly means.*

*31. The improved outdoor lighting system of claim 27, wherein said fuse of said fuse assembly is positioned in a portion of said box that is completely underground.*

*32. The improved outdoor lighting system of claim 28, wherein said surge arrestor circuit of said lightning arrestor is positioned in a portion of said box that is completely underground.*

*33. The improved outdoor lighting system of claim 25, wherein said box is waterproof.*

*34. The improved outdoor lighting system of claim 26, wherein said box is waterproof.*

*35. The improved outdoor lighting system of claim 11, wherein the fuse assembly includes at least one fuse, and a box for containing said fuse assembly.*

*36. The improved outdoor lighting system of claim 12, wherein the lightning arrestor includes a surge arrestor circuit contained in a box.*

*37. The improved outdoor lighting system of claims 35 or 36, wherein said box is underground and positioned below and beside said proximal end of said mast.*

*38. The improved outdoor lighting system of claim 35, wherein said fuse is positioned in a portion of said box that is completely underground.*

*39. The improved outdoor lighting system of claim 36, wherein said surge arrestor circuit is positioned in a portion of said box that is completely underground.*

*40. The improved outdoor lighting system of claim 24, further comprising an underground fuse assembly including a fuse electrically connected to said second portion of said cable, and a box for containing said fuse assembly.*

*41. The improved outdoor lighting system of claim 40, wherein said box is underground.*

*42. The improved outdoor lighting system of claim 24, further comprising an underground lightning arrestor including a surge arrestor circuit contained within a box and electrically connected to said second cable portion.*

*43. The improved outdoor lighting system of claim 42, wherein said box is underground.*

*44. The improved outdoor lighting system of claims 41 or 43, wherein said underground box is positioned below and beside said electrical connector assembly means.*

*45. The improved outdoor lighting system of claims 41 or 43, wherein said underground box is waterproof.*

*46. The improved outdoor lighting system of claim 40, wherein said second portion of said cable includes a segment that electrically connects said connector assembly means with said fuse assembly.*

*47. The improved outdoor lighting system of claim 42, wherein said second portion of said cable includes a segment that electrically connects said connector assembly means with said lightning arrestor.*

*48. The improved outdoor lighting system of claim 41, wherein said fuse of said fuse assembly is positioned in a portion of said box that is completely underground.*

*49. The improved outdoor lighting system of claim 43, wherein said surge arrestor circuit of said lighting arrestor is positioned in a portion of said box that is completely underground.*

*50. An improved outdoor lighting system of the type including at least one light assembly one-piece tubular mast having a distal end for supporting an electrically powered light source, and a proximal end mounted directly onto a substantially underground base, and an electrical cable for connecting the light source to a power source, said cable having a first portion disposed within said mast and connected to said light source, and a second portion disposed underground and connected to said power source, wherein the improvement comprises:*

*an electrical connector assembly means for detachably connecting said first and second portions of said cable and for spontaneously disconnecting said portions in response to an application of a tensile force on said connector assembly means that is less than a tensile force necessary to damage the connection between said*

*second portion and said power source, wherein said electrical connector assembly means is located in the interior of the mast near the proximal end thereof,*

*a fuse assembly electrically connected to said second cable portion between said electrical connector assembly means and said power source wherein the need for a fuse assembly in contact with said first cable portion is obviated, and*

*a lightning arrestor electrically connected to said second cable portion between said electrical connector assembly means and said power source,*

*wherein said fuse assembly and said lightning arrestor are contained in a box located beneath said electrical connector assembly means.*

*51. The improved outdoor lighting system of claim 50, wherein said first cable portion is integrally formed without splice connections, and terminates in a male connector that forms part of said electrical connector assembly means.*

*52. The improved outdoor lighting system of claim 51, wherein said male connector is integrally connected to an end of said first cable portion.*

*53. The improved outdoor lighting system of claim 50, wherein said box is separate from said electrical connector assembly means.*

*54. An improved outdoor lighting system of the type including at least one light assembly tubular mast having a distal end for supporting an electrically powered light source, and a proximal end mounted in the ground, and an electrical cable for connecting the light source to a power source, said cable having a first portion disposed within said mast and connected to said light source, and a second portion disposed underground and connected to said power source, wherein the improvement comprises:*

*an electrical connector assembly means for detachably connecting said first and second portions of said cable and for spontaneously disconnecting said portions in response to an application of a tensile force on said connector assembly means that is less than a tensile force necessary to damage the connection between said second portion and said power source, wherein said electrical connector assembly means is located in the interior of the mast near the proximal end thereof, and*

*a lightning arrestor electrically connected to said second cable portion between said electrical connector assembly means and said power source;*

*a box containing said lightning arrestor,*

*wherein said first cable portion is integrally formed without splice connections, and terminates in a male connector that forms part of said electrical connector assembly means.*

*55. An improved outdoor lighting system of the type including at least one light assembly, one-piece tubular mast having a distal end for supporting an electrically powered light source, and a proximal end directly mounted to an underground base, and an electrical cable for connecting the light source to a power source, said cable having a first portion disposed within an interior of said mast and connected to said light source, and a second portion disposed underground and connected to said power source, wherein the improvement comprises:*

*an electrical connector assembly means for detachably connecting said first and second portions of said cable and for spontaneously disconnecting said portions in response to an application of a tensile force on said electrical connector assembly means that is less than a tensile force necessary to damage the connection between said second portion and said power source, and*

*a lightning arrestor electrically connected to said second cable portion between said electrical connector assembly means and said power source,*

*wherein said lightning arrestor is spaced apart from said electrical connector assembly means by a length of said cable and is located outside of said mast interior.*

*56. The improved outdoor lighting system of claim 55, wherein said lightning arrestor is contained within a box.*

*57. The improved outdoor lighting system of claim 56, wherein said lightning arrestor is contained with a portion of said box located completely underground.*

* * * * *